UNITED STATES PATENT OFFICE.

WILL N. SHRUM, OF DALLAS, TEXAS, ASSIGNOR TO FRED E. TENNANT, JAMES W. JEWELL, AND CLIFFORD F. MERRITT, ALL OF DALLAS, TEXAS.

ANTILEAK COMPOSITION.

REISSUED

1,383,572.  Specification of Letters Patent.  Patented July 5, 1921.

No Drawing. Application filed January 16, 1919, Serial No. 271,517. Renewed January 21, 1921. Serial No. 439,053.

*To all whom it may concern:*

Be it known that I, WILL N. SHRUM, a citizen of the United States, residing at Dallas, in the county of Dallas and State of Texas, have invented certain new and useful Improvements in Antileak Composition, of which the following is a specification.

This invention relates to a preparation for stopping and preventing leaks in radiators, water pipes, boilers and other liquid holding vessels, or containers. While the main object of the invention is to prevent water escaping from leaks already formed, it can be, as in the case of radiators, placed in the water before any leak is detected, and will automatically prevent any leak from showing up by stopping any puncture as soon as it becomes of sufficient size to permit water to enter it.

In testing the device I have found that considerable care is required to get just the right amount of some of the ingredients, as the proportions employed are as important as the ingredients themselves.

In preparing ten gallons of liquid composition I take one pound of asbestos, one and one half pounds of dry paper, two gallons of wheat or rice paste, one half ounce of gum arabic, one half ounce of English rosin, one half ounce of safrol, or any similar deodorizing agency, one fourth ounce of salicyclic acid and one eighth of a pint of denatured or wood alcohol. This last is employed as a solvent, especially for the resin.

With the exception of the safrol, alcohol, and paste these ingredients are in a dry and finely comminuted state. To the above I add a sufficient amount of water to make up the ten gallons.

To stop or prevent a leak a portion of this is poured into the receptacle in which the leak is to be stopped or prevented. In an automobile radiator for example about one quart of the solution is added to the water already contained in the radiator, which will be possibly from four to five gallons.

As previously stated the proportions of some of the ingredients are very important. If more than the amount of paper is used it will clog, if less is used it will fail to do the work required of it. The rosin forms a binder for the paper and asbestos, and the amount used is important. It must be just sufficient to allow the ingredients to remain in a fluid state until they have entered the opening to be stopped, and to cause them to become hard, dry and impervious to water as soon as exposed to the outer air. The proportions mentioned are those that exhaustive tests have proven to be most efficient, and in preparing the solution accurate measurements should be made.

What I claim is:

A composition for stopping leaks in radiators, boilers, etc., consisting of finely ground paper, one and one half pounds, comminuted asbestos, one pound, two gallons of a starchy paste, one half ounce of gum arabic or an equivalent gum, one half ounce resin, a suitable deodorizer, one half ounce salicylic acid, and one eighth of a pint of alcohol, all added to a sufficient amount of water to equal ten gallons.

In testimony whereof I affix my signature.

WILL N. SHRUM.